(12) United States Patent
Hladik et al.

(10) Patent No.: US 8,506,695 B2
(45) Date of Patent: Aug. 13, 2013

(54) COATING COMPOSITIONS

(75) Inventors: Molly L. Hladik, Monmouth, OR (US);
Mehrgan Khavari, Corvallis, OR (US);
Cari L. Dorsh, McMinnville, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1729 days.

(21) Appl. No.: 11/586,119

(22) Filed: Oct. 25, 2006

(65) Prior Publication Data

US 2008/0103042 A1     May 1, 2008

(51) Int. Cl.
*B41M 5/337*     (2006.01)
(52) U.S. Cl.
USPC .................. 106/31.16; 106/31.18; 106/31.19; 106/31.22; 503/214

(58) Field of Classification Search
None
See application file for complete search history.

(56) References Cited

U.S. PATENT DOCUMENTS

| | | |
|---|---|---|
| 2005/0089782 A1 | 4/2005 | Kasperchik et al. |
| 2005/0277070 A1 | 12/2005 | Kasperchik et al. |
| 2007/0092845 A1 | 4/2007 | Gore |
| 2007/0105039 A1 | 5/2007 | Kasperchik et al. |
| 2007/0212639 A1 | 9/2007 | Kasperchik et al. |
| 2007/0248918 A1 | 10/2007 | Kasperchik et al. |

FOREIGN PATENT DOCUMENTS

WO     2008076132 A1     6/2008

OTHER PUBLICATIONS

Patent Cooperation Treaty; International Search Report; May 8, 2009; 5 pages; European Patent Office.

*Primary Examiner* — Bruce H Hess

(57) ABSTRACT

Coating compositions and industrial packages including the coating compositions are disclosed.

16 Claims, No Drawings

COATING COMPOSITIONS

BACKGROUND

Compositions that produce a color change upon exposure to energy in the form of light or heat are of great interest in generating images on a variety of substrates. For example, indicia are frequently printed onto optical discs, product packaging, adhesive labels, or other substrates to provide a decorative appearance, to provide information and/or to aid in identification of the item or provide other content.

Traditionally, the production of images on paper-based or polymer-based substrates has been by way of screen, flexographic, offset, lithographic printing or other known printing methods, frequently performed at a converting facility. In the packaging industry the term "converter" refers to a company that converts raw packaging material (e.g., flexible polymers, paper, and cardboard) into useable packaging products by printing upon the material, cutting, laminating, and the like. From the converter, the packaging product, usually in the form of a roll of flexible film or paper products, is then sent to packaging houses where packaging equipment such as a vertical or horizontal form feed and seal equipment is used for packaging the products and stamping them with a tracking or ID code. In many processes, it is important that the packagers provide for the continuous operation of date-code or other package marking equipment.

Time and date stamps, common to a wide variety of commercial packages worldwide, are commonly applied primarily by thermal transfer ribbon, continuous inkjet, and laser printing processes. Specific to laser marking, the laser, using high power (6 Watts or higher) has to imprint or burn in an image by ablation. Ablation is a process in which the substrate, depending on its nature, is melted, displaced, or disintegrated by the energy of the laser beam. This process is often accompanied by smoke and particulates, which can be an undesirable side effect for the packager. Air handling and purification equipment is often used to keep the area clean of particulates and smoke that might have an adverse effect on the packaged product or the seal integrity of the packaging itself. Additionally, the use of lasers for marking is limited to relatively thick substrates (greater than 0.25 mm) where the chance of punch-through is minimal as compared to a flexible packaging film where the web thickness is usually less than 0.150 mm.

Where continuous inkjet or thermal transfer ribbons are used, there is also a need to have consumables on the premises. In such processes, changeovers for replenishment of the consumables can result in periodic down time.

One challenge that image-forming compositions present is sensitivity to heat and/or pressure. This is a particular problem in the realm of industrial packaging, such as cardboard boxes, polymer bags, and the like. During production, industrial packaging materials can be subjected to high pressure from rollers, cutters and other production equipment, and also to high temperatures, such as from lamination and sealing processes. For example, co-extrusion laminating processes, in which a tie layer is extruded by melting a thin layer of polymer between two flexible films, can reach temperatures as high as 120° C., and impose pressures up to about 1000 psi.

When subjected to elevated temperature and/or pressure, many image-forming compositions prematurely darken, reducing or eliminating their ability for later development to produce a desired image. Some image-forming compositions darken at temperatures as low as 60° to 75° C., and most will darken at relatively low temperatures when subjected to elevated pressure, depending upon the pressure level.

Thus, there is a need in the industry for compositions and methods that may overcome one or more of the deficiencies and/or inadequacies described herein.

SUMMARY

Briefly described, embodiments of this disclosure include coating compositions and industrial packages including the coating compositions. One exemplary embodiment of a coating composition, among others, includes: a matrix material phase including a matrix material having an activator dissolved in the matrix material; and a color former phase including a color former, wherein the color former phase is not soluble in the matrix material phase at room temperature, wherein the matrix material phase and the color former phase do not diffuse until above a first temperature and a first pressure, wherein during diffusion the activator reacts with the color former to change the color of the color former; wherein the first temperature is above about 120 C; and wherein the first pressure is above about 500 psi.

One exemplary embodiment of a coating composition, among others, includes: a matrix material phase including a matrix material having an activator dissolved in the matrix material; and a color former phase including a color former, wherein the color former phase is not soluble in the matrix material phase at room temperature, wherein one of the following is present: the matrix material phase does not flow until above about 150° C. at above about 500 psi, the color former does not melt below about 120° C., and a combination thereof.

One exemplary embodiment of an industrial package, among others, includes: a coating composition as described herein disposed on the industrial package.

One exemplary embodiment of a composition, among others, includes: a matrix material phase including a matrix material having an activator dissolved in the matrix material, wherein the matrix material is selected from: tripropylene glycol diacrylate oligomer, melamine acrylate oligomer, an amine functional polyester acrylate oligomer, hexanediol diacrylate oligomer, dendritic polyester-based acrylate oligomer, bisphenol-A epoxy diacrylate oligomer, and combinations thereof; and a color former phase including a color former, wherein the color former phase is not soluble in the matrix material phase at room temperature.

DETAILED DESCRIPTION

Embodiments of the present disclosure will employ, unless otherwise indicated, techniques of synthetic organic chemistry, ink chemistry, media chemistry, printing chemistry, and the like, that are within the skill of the art. Such techniques are explained fully in the literature.

In the following description, for purposes of explanation, numerous specific details are set forth in order to provide a thorough understanding of the present disclosure. It will be apparent, however, to one skilled in the art to which the present disclosure relates, that the disclosed composition and systems and methods may be practiced without these specific details. Reference in the specification to "an embodiment" means that a particular feature, structure, or characteristic described in connection with the embodiment is included in at least one embodiment.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, pressure, and the like) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

For purposes of the present disclosure, the term "color" or "colored" refers to absorbance and reflectance properties that are preferably visible, including properties that result in black, white, or traditional color appearance. In other words, the terms "color" or "colored" includes black, white, and traditional colors, as well as other visual properties (e.g., pearlescence, reflectivity, translucence, transparency, and the like).

The term "color former" is a color forming substance, which is colorless or one color in a non-activated state and produces or changes color in an activated state.

As used herein, the term "leuco-dye" means a color-forming substance that is colorless or of a first color in a non-activated state, and subsequently exhibits color or changes from the first color to a second color in an activated state.

As used herein, the term "activator" is a substance that reacts with a color former such as a leuco-dye, causing the leuco-dye to alter its chemical structure and change or acquire color. By way of example only, activators may be phenolic or other proton-donating species that can effect this change.

As used herein, the term "antenna" is a radiation-absorbing compound. The antenna readily absorbs a desired specific wavelength of the marking radiation.

DISCUSSION

Embodiments of the present disclosure include coating compositions and articles including coating compositions. The coating composition does not develop at temperatures below about 120° C. and/or is resistant to high pressures (e.g., about 500 psi to 3500 psi or more). Embodiments of the coating compositions are advantageous for product packaging because the coating can be applied to the packaging and cured during manufacture (e.g., at temperatures at about 110° C.), then later developed by exposure to light (e.g., a laser source) or heat to produce a desired image. Embodiments of the present disclosure are well suited for use on industrial packages (e.g., such as boxes and bags) because the coating composition resists premature development, which are frequently subject to elevated temperature and pressure during production. Embodiments of the coating composition allow labels and other indicia to be quickly and easily created directly on a package, without the need for complex, relatively inflexible, and sometimes messy ink printing systems.

Embodiments of the present disclosure allow for the coating composition to be applied to an article such as a packaging substrate during the converting process by conventional printing processes. The coating composition can be a stand-alone coating, or it can be used in combination with conventional color images, texts, bar codes, and the like. The coating composition can be applied on the surface of a package, or disposed in lamination between layers of packaging films. Once the article including the coating composition is formed into a package, at a later time the coated area can be imaged using a device that generates heat or coherent light of specific wavelengths (e.g., laser) at an energy level at which the coating chemistry changes color.

The coating composition can include, but is not limited to, a matrix material phase (e.g., a matrix material) and a color former phase (e.g., a color former). The color former phase is insoluble in the matrix material phase at room temperature so that the coating composition has two distinct phases. The color former phase is uniformly dispersed throughout the matrix material phase as a fine dispersion of particles, for example. The color former phase includes a color former that can be developed upon interaction with an activator, which is dissolved in the matrix material phase. The color former and activator can interact when the coating composition or portions thereof are heated to a specified temperature and under a certain pressure and the color former melts and the activator flows so that the two come into contact, react, and the color former undergoes a color change. In other words, under a certain temperature and pressure conditions (e.g., above 120° C. and 500 psi), diffusion occurs and the color former and the activator come into contact, react, and the color former undergoes a color change.

The matrix material phase and/or the color former phase, or particular components of one or both, prevent development of the coating at temperatures less than about 120° C. at 500 psi or more. The components of the coating composition do not diffuse until above about 120° C. at 500 psi or more (e.g., about 500 to 3500 psi). In other words, the components necessary for developing (e.g., a leuco dye (color former phase) and an activator (matrix material phase)) do not come into contact, react, and produce a color change in the color former until above about 120° C. at 500 psi or more. The temperature is above about 120° C., above about 130° C., above about 140° C., above about 150° C., above about 160° C., above about 170° C., above about 180° C., above about 190° C., above about 200° C., above about 210° C., and above about 220° C. The pressure is above about 500 psi, above about 700 psi, above about 900 psi, above about 1100 psi, above about 1300 psi, above about 1800 psi, above about 2300 psi, above about 2800 psi, and above about 3500 psi.

In another embodiment, the coating composition can be defined by having one of the following: a matrix material phase that does not flow (cause diffusion of the components of the matrix material phase with the components of the color former phase) until above about 150° C. at 500 psi or more (e.g., about 500 to 3500 psi), a color former that melts above about 120° C., or a combination thereof. The melting temperature is above about 120° C., above about 130° C., above about 140° C., above about 150° C., above about 160° C., above about 170° C., above about 180° C., above about 190° C., above about 200° C., above about 210° C., and above about 220° C. The pressure is above about 500 psi, above about 700 psi, above about 900 psi, above about 1100 psi, above about 1300 psi, above about 1800 psi, above about 2300 psi, above about 2800 psi, and above about 3500 psi.

Matrix Material Phase

As mentioned above, the matrix material phase includes, but is not limited to, a matrix material having an activator dissolved therein. The matrix material can include, but is not limited to, isobornyl methacrylate, isobornyl acrylate, dicyclopentadienyl acrylate, dicyclopentadienyl methacrylate, cyclohexyl (meth)acrylate, cyclohexyl acrylate, cyclohexyl (meth)acrylate, dicyclopentanyl (meth)acrylate, methyl methacrylate, tert-butyl acrylate, tert-butyl methacrylate, dicyclopentanyloxyethyl (meth)acrylate, dicyclopentenyloxyethyl (meth)acrylate, 4-tert-butylstyrene, other styrene derivatives, and the like.

In an embodiment, the matrix may include Nor-Cote CLCDG-1250A (a mixture of UV curable acrylate monomers and oligomers) that contains a photoinitiator (hydroxyl ketone) and organic solvent acrylates, such as, methyl methacrylate, hexyl methacrylate, beta-phenoxy ethyl acrylate, and hexamethylenediol diacrylate.

In an embodiment, the matrix may include one or more of the following components: tripropylene glycol diacrylate oligomer, melamine acrylate oligomer, an amine functional polyester acrylate oligomer, hexanediol diacrylate oligomer, dendritic polyester-based acrylate oligomer, and bisphenol-A epoxy diacrylate oligomer.

Other suitable components for the matrix may include, but are not limited to, acrylated polyester oligomers, such as CN293 and CN294 as well as CN-292 (low viscosity polyester acrylate oligomer), Ebecryl 80, 81 and 83, 1,6-hexanediol diacrylate (commercially known as SR-238), tripropylene glycol diacrylate (commercially known as SR-306HP), trimethylolpropane triacrylate commercially known as SR-351, Di-trimethylolpropane tetraacrylate commercially known as SR355, isodecyl acrylate commercially known as SR-395, and 2(2-ethoxyethoxy)ethyl acrylate commercially known as SR-256, all of which are commercially available from Sartomer Co.

The matrix material is about 10 to 80 weight % of the coating composition, 30 to 70 weight % of the coating composition, and 45 to 60 weight % of the coating composition.

To enable curing of the coating by UV or other electromagnetic radiation, the matrix material phase includes one or more light-absorbing species, such as photoinitiators, which initiate reactions for curing of the matrix material, such as, by way of example, benzophenone derivatives. Other examples of photoinitiators for free radical polymerization monomers and oligomers include, but are not limited to, thioxanethone derivatives, anthraquinone derivatives, acetophenones, benzoine ethers, and the like.

Matrix materials based on cationic polymerization resins may require photoinitiators based on aromatic diazonium salts, aromatic halonium salts, aromatic sulfonium salts, metallocene compounds, and the like.

The photoinitiator is about 0.1 to 20 weight % of the coating composition, 2 to 15 weight % of the coating composition, and 6 to 10 weight % of the coating composition.

In addition, an activator is dispersed or dissolved in the matrix material phase. The activator can include, but is not limited to, a phenolic species, capable of developing color when reacting with a leuco dye, and that is soluble or partially soluble in the coating matrix phase. The activator can include, but is not limited to, acidic phenolic compounds such as, for example, Bis-Phenol A, p-Hydroxy Benzyl Benzoate, Bisphenol S (4,4-Dihydroxydiphenyl Sulfone), 2,4-Dihydroxydiphenyl Sulfone, Bis(4-hydroxy-3-allylphenyl)sulfone (Trade name—TG-SA), 4-Hydroxyphenyl-4'-isopropoxy diphenyl sulfone (Trade name—D8). The activator may be either completely or at least partially dissolved in the matrix material phase, but does not interact with the color former at temperatures below 120° C.

The activator is about 2 to 30 weight % of the coating composition, 5 to 20 weight % of the coating composition, and 10 to 15 weight % of the coating composition.

Color Former Phase

As mentioned above, the composition includes a color former phase that includes a color-former. The color former can include, but is not limited to, a leuco dye and/or a leuco dye alloy (referred to herein as a "leuco-dye phase").

For color forming to occur, the leuco dye must melt and mix with the activator. In an embodiment, a composition including a leuco dye with a melting point above about 120° C. can prevent development of the composition at temperatures below 120° C. The leuco dye phase can have melting points above about 120° C., above about 150° C., above about 180° C., and above about 220° C. In another embodiment, the leuco dye phase can have a melting point less than 120° C.

The leuco dye phase can include leuco dyes such as, but not limited to, fluorans, phthalides, amino-triarylmethanes, aminoxanthenes, aminothioxanthenes, amino-9,10-dihydroacridines, aminophenoxazines, aminophenothiazines, aminodihydro-phenazines, aminodiphenylmethanes, aminohydrocinnamic acids (cyanoethanes, leuco methines) and corresponding esters, 2(phydroxyphenyl)-4,5-diphenylimidazoles, indanones, leuco indamines, hydrozines, leuco indigoid dyes, amino-2,3-dihydroanthraquinones, tetrahalop, p'-biphenols, 2(p-hydroxyphenyl)-4,5-diphenylimidazoles, phenethylanilines, and mixtures thereof. According to one particular aspect of the present exemplary system and method, the leuco dye can be a fluoran, phthalide, aminotriarylmethane, or mixture thereof. In an embodiment, the dye is 4,4 dihydroxydiphenyl sulfone (Bisphenol S).

Several nonlimiting examples of suitable fluoran based leuco dyes include, but are not limited to, 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino) fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone, 4,5,6, 7-tetrachloro-3,3-bis[2-[4-(dimethylamino)phenyl]-2-(4-methoxyphenyl)ethenyl], and mixtures thereof.

High melting point aminotriarylmethane leuco dyes can also be used in the present disclosure such as, but not limited to, tris(N,N-dimethylaminophenyl)methane (LCV); tris(N, N-diethylaminophenyl)methane (LECV); tris(N,N-di-n-propylaminophenyl)methane (LPCV); tris(N,N-dinbutylaminophenyl)methane (LBCV); bis(4-d iethylaminophenyl)-(4-diethylamino-2-methyl-phenyl)methane (LV-1); bis(4-diethylamino-2-methylphenyl)-(4-diethylamino-phenyl) methane (LV-2); tris(4-diethylamino-2-methylphenyl) methane (LV-3); bis(4-diethylamino-2-methylphenyl)(3,4-dimethoxyphenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl.

The color former is about 10 to 50 weight % of the coating composition, 10 to 35 weight % of the coating composition, and 10 to 20 weight % of the coating composition.

In an embodiment, the color former phase can include a mixing aid. Depending upon the actual melting point of the particular leuco dye selected, melting aids may be included with the above-mentioned leuco dyes. The melting aids can include, but are in no way limited to, crystalline organic solids with melting temperatures above 120° C. The melting aid can include, but is not limited to, aromatic hydrocarbons (or their derivatives) that provide solvent characteristics for leuco dye. In particular, the melting aids can include, but are not limited to, terphenyl, p-benzyl biphenyl, alpha-naphtol benzylether, 1,2[bis(3,4]dimethylphenyl)ethane.

The melting aid is about 0 to 10 weight % of the coating composition, 0 to 5 weight % of the coating composition, and 0 to 2 weight % of the coating composition.

Other Components

The coating composition can include one or more other components such as, but not limited to, radiation absorbing compound, buffering agents, and surfactants. The term "radiation absorbing compound" (e.g., an antenna) means any radiation absorbing compound in which the antenna readily absorbs a desired specific wavelength of the marking radiation. The radiation absorbing compound may be a material that effectively absorbs the type of energy to be applied to the print substrate 16 to effect a mark or color change. The radiation absorbing compound can include, but is not limited to, IR780 (Aldrich 42,531-1) (1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)); IR783 (Aldrich 54,329-2) (2) (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt); Syntec 9/1 (3)); Syntec 9/3 (4); or metal complexes (e.g., dithiolane metal complexes (5) and indoaniline metal complexes (6)).

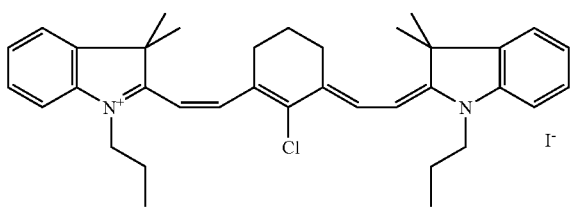

(1)

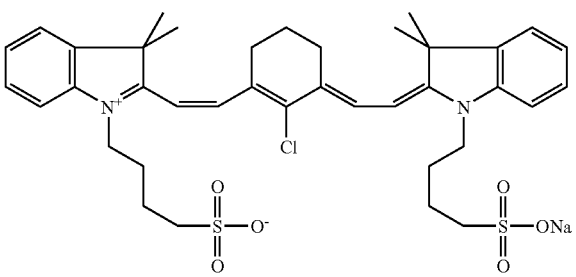

(2)

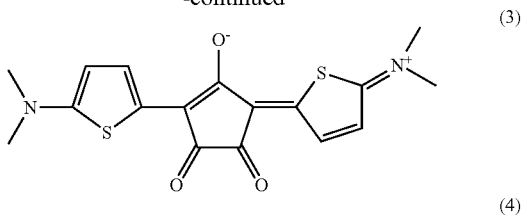

(3)

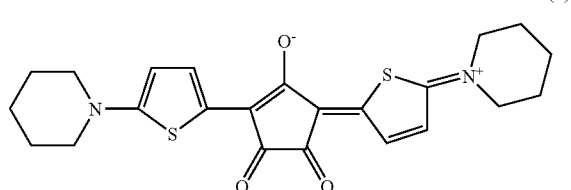

(4)

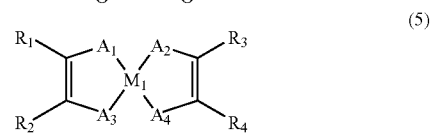

(5)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

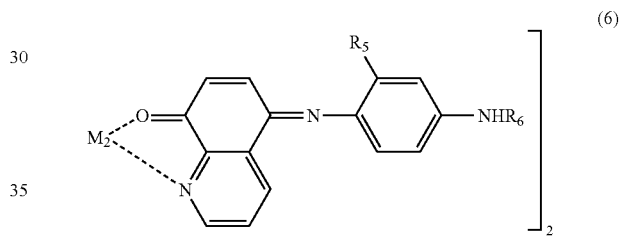

(6)

where $M_2$ is Ni or Cu and $R_5$ and $R_6$ are aryl or alkyl groups with or without halo substituents.

Additional examples of radiation absorbing compounds can be found in "Infrared Absorbing Dyes", Matsuoka, Masaru, ed., Plenum Press (1990) (ISBN 0-306-43478-4) and "Near-Infrared Dyes for High Technology Applications", Daehne, S.; Resch-Genger, U.; Wolfbeis, O., Ed., Kluwer Academic Publishers (ISBN 0-7923-5101-0), both incorporated herein by reference.

Various buffering agents or pH adjusting agents can also be optionally used in the ink compositions of the present disclosure. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the optical density characteristics of the present disclosure.

Coating Composition Forming Method

In general, a method of forming the coating composition includes preparing the matrix material phase with an activator species dissolved therein, preparing color former phase, and evenly distributing the color former phase in the matrix material phase. Then, the coating composition can be disposed on an appropriate surface of an article using methods known in the art.

As mentioned above, the color former phase is uniformly dispersed or distributed in the matrix material phase as a separate phase in the coating composition. In other words, at ambient temperature, the color former phase is substantially insoluble in the matrix phase. Consequently, the color former and the activator are contained in the separate phases and do not react with color formation at ambient temperature. However, upon heating with laser radiation to a suitable temperature (above 120° C.) and pressure (above 500 psi), both phases melt and mix. Once mixed together, color is developed due to a reaction between the color former and the activator. For example, when a leuco dye and the activator melt and react, proton transfer from the activator opens a lactone ring of the leuco dye, resulting in an extension of conjugate double bond system and color formation. The selective radiation exposure of the coating composition can be used to form an image.

Briefly, the coating composition can be applied to any number of desired substrates including, but not limited to, polymer, paper, ceramic, glass, metal, and the like. The coating composition may be applied to a desired substrate using any number of known coating systems and methods. The coating composition can be applied to a substrate with variety of methods. Suitable methods include, for example, screen, flexographic, lithographic, and offset printing processes. A flexographic printing process, in particular, can allow for blanket coating of an entire surface, or, alternatively, allow for spot coating a specific area of the substrate. The coating composition layer is then exposed to a UV light source to cure the film.

EXAMPLES

While embodiments of the present disclosure are described in connection with Examples 1-6 and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example #1

A mixture was prepared including the following, in % by weight:

| | |
|---|---|
| Norcote XP155-049/10 | 46.73 |
| Bisphenol S | 3.5 |
| D-8 | 8.2 |
| YSR | 2.2 |
| Irgacure 1300 | 6.0 |
| Cirrus 715 | 1.7 |
| BK400 | 31.67 |
| TOTAL | 100.00 |

The Norcote XP155-049/10 is a liquid lacquer that is commercially available, and has a proprietary formulation. D-8 is 4-Hydroxyphenyl-4'-isopropoxy diphenyl sulfone, and YSR is $S[C_6H_2\text{---}(CH_3)(OH)\text{---}C(CH_3)_3]_2$. D8, Bisphenol S, and YSR are available as a powdered solid, which is mixed into the base lacquer. Irgacure 1300 is a 30%/70% mixture of 2-Benzyl-2-(dimethylamino)-1-[4-(4-morpholinyl)phenyl]-1-butanone and Alpha, alpha-dimethoxy-alpha-phenylacetophenone. Cirrus 715 is a commercially available powder having a proprietary formulation. BK400 is 2-Anilino-6-dibutylamino-3-methylfluoran, available in powdered form.

The complete mixture, in liquid form, was applied by analox roll or screen printing upon a paper substrate, and cured by exposure to UV light. The inventors have tested this formulation and verified that it provides desirable image-forming characteristics upon exposure to imaging radiation.

In preliminary tests, separate samples of the paper substrate having the cured coating thereupon were run through a laminating machine (model Docuseal 40 from GBC) having a stated operating temperature of from about 150°-302° F., and a feed rate of approximately 4.65 mm/sec. After passing through the laminating machine, the brightness of the samples was measured using a Spectrolino, and the resulting brightness value was compared to the original brightness of the sample. In one test, a first sample of the substrate treated with the cured coating was fed through the laminator sandwiched between two layers of 5 mil. lamination media (GBC 3740471). Following this test, the first sample was observed to experience no substantial darkening from the heat of lamination. Because the presence of laminating media can reduce the transmission of heat to the coated substrate, in another test a second sample of the substrate treated with the cured coating was fed through the laminator without any laminating media. Following this test, the second sample was observed to experience no substantial darkening from the heat of lamination.

For comparison, samples of other thermal imaging papers were subjected to the same process. Three samples of commercially available thermal fax paper (PM #69666; NCR 998316; Staples brand Fax paper # PO 719386) were sent through the laminating machine both without laminating media and sandwiched between 5 mil laminating media. In each test of each thermal fax paper, the samples were noticeably darkened as a result of exposure to the heat of the laminating machine.

In a series of more rigorous and tightly controlled tests, samples of the substrate having the cured coating thereupon were simultaneously subjected to elevated pressure and temperature by means of a heated nip roller. In these tests, temperatures ranged from about 24° C. to 121° C. Multiple tests were done at nip pressures of 500 psi, 1000 psi, 2000 psi, 3000 psi, and 3500 psi. The samples having a cured image-forming coating according to the above mixture did not show any appreciable darkening at any temperature/pressure combination until at a temperature above 100° C. and a pressure of 3500 psi. All pressure and temperature combinations that were tested below this level showed no appreciable darkening.

For comparison, multiple samples of the three commercially available thermal papers considered in the preliminary testing noted above were also tested using the heated nip roller. Each of these samples showed substantial darkening at substantially lower temperature and pressure combinations than those for the coating described herein. Specifically, the PM #69666 thermal fax paper began to significantly darken at a temperature of about 82° C. and a pressure of 500 psi. The NCR 998316 sample began to significantly darken at a temperature of about 82° C. and a pressure of 2000 psi. The Staples brand fax paper # PO 719386 began to significantly darken at a temperature of about 82° C. and a pressure of 500 psi, and also darkened noticeably at a temperature of about 73° C. and a pressure of 2000 psi.

Example #2

A mixture was prepared including the following, in % by weight:

| | |
|---|---|
| Base Lacquer XP155-049/10 from Norcote) | 46.73 |
| Bisphenol S | 3.6 |
| D-8 | 8.4 |
| YSR | 2.26 |
| (Irgacure 1300) | 6.15 |
| BK400 | 31.67 |
| TOTAL | 100.00 |

Norcote XP155-049/10 is a liquid lacquer that is commercially available, and has a proprietary formulation. D-8 is 4-Hydroxyphenyl-4'-isopropoxyphenyl sulfone, and YSR is $S[C_6H_2-(CH_3)(OH)-C(CH_3)_3]_2$. D8, Bisphenol S and YSR are available as a powdered solid which, is mixed into the base lacquer. Irgacure 1300 is a 30%/70% mixture of 2-Benzyl-2-(dimethylamino)-1-[4-(4-morpholinyl)phenyl]-1-butanone and Alpha, alpha-dimethoxy-alpha-phenylacetophenone. BK400 is 2-Anilino-6-dibutylamino-3-methylfluoran, available in powdered form.

The mixture formulation provided above does not include an antenna dye. However, the inventors have tested this formulation with the addition of an antenna dye, and have verified that it provides desirable image-forming characteristics upon exposure to imaging radiation. The mixture noted above, in liquid form, was applied by analox roll or screen printing upon a paper substrate, and cured by exposure to UV light at a wavelength.

In preliminary tests, separate samples of the paper substrate having the cured coating thereupon were run through the same laminating machine and with the same characteristics as in the preliminary tests described above with respect to Example #1. After passing through the laminating machine, the brightness of the samples was measured in the manner described above. The samples were fed through the laminator sandwiched between layers of 5 mil. lamination media, and also without any laminating media. Following each test, the samples were observed to experience no substantial darkening from the heat of lamination.

Example #3

A mixture was prepared including the following, in % by weight:

| Lacquer | |
|---|---|
| Tripropylene glycol Diacrylate | 12.0 |
| Bomar BMA 222 | 24.0 |
| Cytec Surf Spec Ebecryl 83 | 24.0 |
| Total Lacquer | 60.0 |
| Bisphenol S | 10.0 |
| BK400 | 20.0 |
| Irgacure 2022 | 8.0 |
| Additive Ebecryl 350 | 0.5 |
| Additive Foam Blast 20F | 1.5 |
| TOTAL | 100.00 |

Bomar BMA 222 is a multifunctional melamine acrylate oligomer (liquid), and Cytec Surf Spec Ebecryl 83 is an amine functional polyester acrylate oligomer (liquid). BK 400 is as described above. Irgacure 2022 is a mixture of Irgacure 819 (phosphine oxide, phenyl bis(2,4,6-trimethyl benzoyl)) (20 wt %), and Darocure 1173 (2-hydroxy-2-methyl-1-phenyl-1-propanone) (80 wt %). Cytec Ebecryl 350 is a silicone diacrylate (liquid), and Foam Blast 20F is siliconized silica (liquid).

This liquid mixture can be applied by analox roll or screen printing onto a paper, polymer, or other substrate. This mixture has been prepared, but not fully tested.

Example #4

A mixture was prepared including the following, in % by weight:

| Lacquer | |
|---|---|
| Tripropylene glycol Diacrylate | 13.0 |
| Bomar BMA 222 | 26.0 |
| Cytec Surf Spec Ebecryl 83 | 26.0 |
| Total Lacquer | 65.0 |
| Bisphenol S | 10.0 |
| BK400 | 20.0 |
| Irgacure 819 | 3.0 |
| Additive Ebecryl 350 | 0.5 |
| Additive Foam Blast 20F | 1.5 |
| TOTAL | 100.00 |

The constituents in this mixture are as defined above. This liquid mixture can be applied by analox roll or screen printing onto a paper, polymer, or other substrate. This mixture has been prepared, but not fully tested.

Example #5

A mixture was prepared including the following, in % by weight:

| Base Lacquer | |
|---|---|
| Hexanediol Diacrylate | 62.33 |
| Bomar BDE 1029 | 14.12 |
| Cytec Surf Spec Ebecryl 605 | 14.13 |
| Tripropylene glycol Diacrylate | 9.42 |
| Total Lacquer | 100.0 |
| Total Coating | |
| Base Lacquer | 49.0 |
| Bisphenol S | 4.0 |
| D-8 | 4.5 |
| Pergafast 201 | 6.0 |
| YSR | 2.5 |
| Irgacure 819 | 9.0 |
| BK 400 | 25.0 |
| TOTAL | 100.00 |

Bomar BDE 1029 is dendritic polyester-based acrylate oligomer (liquid), Cytec Surf Spec Ebecryl 605 is bisphenol-A epoxy diacrylate oligomer (liquid), and Pergafast 201 is benzenesolfonaminde derivative (solid powder). The other constituents are as described above.

This liquid mixture can be applied by analox roll or screen printing onto a paper, polymer, or other substrate. This mixture has been prepared, but not fully tested for pressure and temperature resistance.

Example #6

A mixture was prepared including the following, in % by weight:

| Base Lacquer | |
|---|---|
| Hexanediol Diacrylate | 62.33 |
| Bomar BDE 1029 | 14.12 |
| Cytec Surf Spec Ebecryl 605 | 14.13 |
| Tripropyleneglycol Diacrylate | 9.42 |
| Total Lacquer | 100.0 |
| Total Coating | |
| Base Lacquer | 52.7 |
| SDP | 4.3 |
| D-8 | 4.85 |
| Pergafast 201 | 6.45 |
| YSR | 2.7 |
| Irgacure 819 | 9.0 |
| BK 400 | 20.0 |
| TOTAL | 100.00 |

The constituents of this mixture are all described above. The liquid mixture can be applied by analox roll or screen printing onto a substrate such as a paper substrate or a polymer based substrate. This mixture has been prepared, but not fully tested for pressure and temperature resistance.

The UV curable laser-writable coating disclosed herein exhibits good image stability when compared to other radiation-imageable thermochromic coatings. Additionally, because of the dye/polymer matrix that is used and the leucodye having a high melting point, the coating disclosed herein can withstand temperatures and pressures that are expected in multi-layer packaging processes, such as those that result from lamination and other processes. The method allows the coating to be applied during the making of the package, then activated later when it is desirable. This allows a thermally active coating to be used in processes where elevated temperatures are required.

One benefit of this coating and its associated method are that it allows a non-contact printing technique. That is, the production of the desired image on the package involves exposing the thermochromic coating to light (e.g., laser light) or heat in a manner well known in laser and thermal printing processes. Thus, unlike screen or other conventional printing methods, there is no need for direct contact of any machinery upon the surface of the package. Likewise, the process of activating or developing the image involves no consumables such as ink, toner, etc. Instead, all components of the coating are applied and cured when the package is manufactured, and all that is required for activation is controlled exposure to light or heat.

Another benefit of the no-contact printing method is that no by-products are created. As noted above, other printing methods that involve ablation of a package surface can create particulates that can contaminate the print area.

Yet another benefit of this coating and method is that indicia on the packaging can be changed in real time, so that packaging labels etc. always correctly relate to the contents. This is possible because the coating is applied at the converter site, but only activated when the packaging is used (i.e., the product is put in the package). With more conventional printing systems, packaging is often produced ahead of time in bulk, and then is used for product that is manufactured later. This time gap between production of the packaging and its can cause pre-printed packaging labels to become out of date or inaccurate by the time the package is used. This can result in production down time while new packaging and/or a new printing setup are prepared. The approach described herein reduces or eliminates this down time.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

What is claimed is:

1. A coating composition, comprising:
a matrix material having an activator dissolved therein; and
particles of color former dispersed in the matrix material,
wherein the color former is not soluble in the matrix material at room temperature and the activator reacts with the color former when mixed therewith to change the color of the color former,
wherein the composition has a viscosity sufficiently low to accommodate any of flexographic printing and offset printing; and
wherein said composition does not comprise an antenna dye.

2. The coating composition of claim 1, wherein the activator and the color former do not mix until the matrix material exceeds a first temperature of 120° C. and a first pressure of about 500 psi.

3. The coating composition of claim 1, wherein the color former does not melt below about 120° C.

4. The coating composition of claim 1, wherein the color former does not melt below about 120° C.

5. The coating composition of claim 1, wherein the matrix material is selected from: tripropylene glycol diacrylate oligomer, melamine acrylate oligomer, an amine functional polyester acrylate oligomer, hexanediol diacrylate oligomer, dendritic polyester-based acrylate oligomer, bisphenol-A epoxy diacrylate oligomer, and combinations thereof.

6. A coating composition, comprising:
a matrix material having an activator dissolved therein; and
particles of color former dispersed in the matrix material,
wherein the color former is not soluble in the matrix material at room temperature and the activator reacts with the color former when mixed therewith to change the color of the color former,
wherein the activator and the color former do not mix until the matrix material exceeds a first temperature and a first pressure;
wherein the first temperature is above about 120° C.;
wherein the first pressure is above about 500 psi;
wherein the color former is 4,4' dihydroxydiphenyl sulfone.

7. The coating composition of claim 1, wherein the matrix material is about 10 to 80 weight % of the coating composition and the color former is about 10 to 50 weight % of the coating composition.

8. The coating composition of claim 1, wherein the matrix material is about 45 to 60 weight % of the coating composition and the color former is about 10 to 20 weight % of the coating composition.

9. The coating composition of claim 1, wherein the color former has a melting point greater than about 150° C.

10. The coating composition of claim 1, wherein the color former has a melting point greater than about 220° C.

11. The coating composition of claim 1, wherein the color former is a leuco dye.

12. The coating composition of claim 11, wherein the leuco dye is selected from fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(phydroxyphenyl)-4,5-diphenylimidazoles, indanones, leuco indamines, hydrozines, leuco indigoid dyes, amino-2,3-dihydroanthraquinones, tetrahalop, p'-biphenols, 2(p-hydroxyphenyl)-4,5-diphenylimidazoles, phenethylanilines, and mixtures thereof.

13. The coating composition of claim 1, wherein the matrix material is selected from: isobornyl methacrylate, isobornyl acrylate, dicyclopentadienyl acrylate, dicyclopentadienyl methacrylate, cyclohexyl (meth)acrylate, cyclohexyl acrylate, cyclohexyl (meth)acrylate, dicyclopentanyl (meth)acrylate, methyl methacrylate, tert-butyl acrylate, tert-butyl methacrylate, dicyclopentanyloxyethyl (meth)acrylate, dicyclopentenyloxyethyl (meth)acrylate, 4-tert-butylstyrene, styrene derivatives, and combinations thereof.

14. The coating composition of claim 1, wherein said composition comprises less than 32% by weight of 2-Anilino-6-dibutylamino-3-methylfluoran.

15. The coating composition of claim 1, wherein said composition comprises a lacquer which comprises at least one of Tripropylene glycol Diacrylate and Hexanediol Diacrylate.

16. A coating composition, comprising:
a matrix material having an activator dissolved therein; and
particles of a color former dispersed in the matrix material, wherein the color former is not soluble in the matrix material at room temperature,
wherein one of the following is present: the matrix material does not flow until above about 150° C. and at above about 500 psi, the color former does not melt below about 120° C., and a combination thereof;
wherein the color former is 4,4' dihydroxydiphenyl sulfone.

* * * * *